Figure 1:
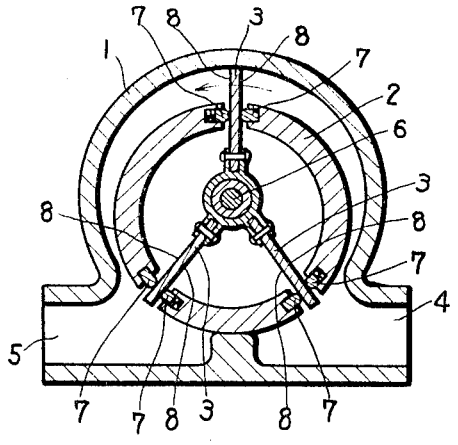
Figure 2:
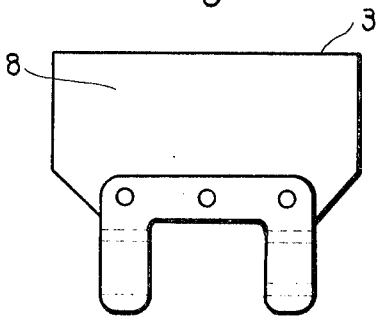
Figure 3:
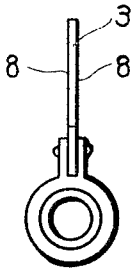
Figure 4:
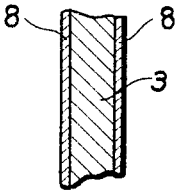

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 7, 1975

930 O.G. 117

T930,007

NONLUBRICATING TYPE VANE PUMP

Osamu Takahashi, Kariya, and Yoshihiko Sumiya, Okazaki, Japan, assignors to Nippondenso Co., Ltd., Showa-cho, Kariya-shi, Aichi-ken, Japan

Filed Mar. 28, 1974, Ser. No. 455,808

Claims priority, application Japan, July 9, 1973, 48/77,637

Int. Cl. F01c *19/00;* F04c *15/00, 27/00*

U.S. Cl. 418—137

1 Sheet Drawing. 5 Pages Specification

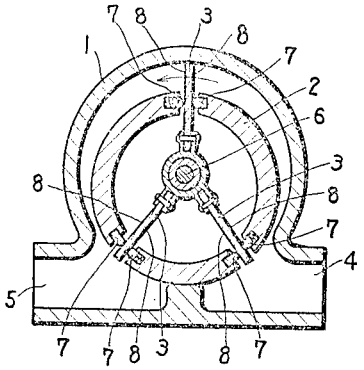

A nonlubricating type vane pump having vanes which are rotatably fitted on a shaft and which are supported by carbon shoes in a rotor is provided wherein the vanes are coated on both surfaces thereof with a lubricating material of high viscosity for reducing the noise caused by the sliding contact of the vane surfaces on the carbon shoes during operation of the vane pump. Silicone oil or silicon grease of high viscosity coated on both surfaces of the vanes or coated on the carbon shoes as well have been tested and found to significantly reduce noise during operation of the pump.

Jan. 7, 1975 OSAMU TAKAHASHI ET AL T930,007

NONLUBRICATING TYPE VANE PUMP

Filed March 28, 1974